(12) United States Patent
Dik et al.

(10) Patent No.: US 8,108,686 B2
(45) Date of Patent: Jan. 31, 2012

(54) METHOD AND SYSTEM FOR DETECTING MODIFIED PAGES

(75) Inventors: Casper H. Dik, Amersfoort (NL); Scott A. Rotondo, Mountain View, CA (US); Joep J. Vesseur, Amstelveen (NL); William Young, Allston, MA (US); John E. Zolnowsky, Milpitas, CA (US)

(73) Assignee: Oracle America, Inc., Redwood City, CA (US)

( * ) Notice: Subject to any disclaimer, the term of this patent is extended or adjusted under 35 U.S.C. 154(b) by 804 days.

(21) Appl. No.: 12/233,331

(22) Filed: Sep. 18, 2008

(65) Prior Publication Data
US 2010/0070775 A1 Mar. 18, 2010

(51) Int. Cl.
*G06F 21/00* (2006.01)
(52) U.S. Cl. .................. 713/187; 713/176
(58) Field of Classification Search .............. None
See application file for complete search history.

(56) References Cited

U.S. PATENT DOCUMENTS

| | | | |
|---|---|---|---|
| 7,257,712 B2 * | 8/2007 | Hughes et al. | 713/176 |
| 7,577,848 B2 * | 8/2009 | Schwartz et al. | 713/187 |
| 7,590,707 B2 * | 9/2009 | McCloy et al. | 709/217 |
| 7,644,287 B2 * | 1/2010 | Oerting et al. | 713/187 |
| 7,831,838 B2 * | 11/2010 | Marr et al. | 713/187 |

* cited by examiner

*Primary Examiner* — Minh Dinh
(74) *Attorney, Agent, or Firm* — Osha • Liang LLP

(57) ABSTRACT

A method for validating program execution. The method involves identifying a program from a second computer system, obtaining, by a first computer system, a first copy of a page for a file of the program from a second computer system, calculating a hash value for the first copy, storing the first copy in a local memory of the first computer system, storing the hash value for the first copy, and executing the program on the first computer system, where the first copy is removed from the local memory during execution of the program. The method further involves obtaining a second copy of the page from the second computer system, calculating a hash for the second copy, determining whether the hash value for the first copy is equal to the hash value for the second copy, and performing an appropriate action in response to the determination.

20 Claims, 4 Drawing Sheets

METHOD AND SYSTEM FOR DETECTING MODIFIED PAGES

BACKGROUND

A typical computer system includes hardware (e.g., processor(s), memory, etc.) and software (e.g., operating system, user-level applications, etc.). The hardware includes functionality to execute the instructions defined in the software. The combination of the hardware and the software allows the user to perform various tasks, such as play games, perform word processing applications, perform geological modeling of a region, and/or perform other such tasks.

The computer system may be connected to other computer systems in a multi-node system. Each computer system is a node in the multi-node system. The interconnection between the nodes in the multi-node system allows the computer system to obtain additional functionality. In multi-node computer systems, it is often desirable to share memory among the nodes, i.e., to provide some form of distributed shared memory in which a process executing on one node may access data stored in the memory or files of one or more other nodes. The shared data may include software and datasets used in the execution of the software.

SUMMARY

In general, in one aspect, the invention relates to a method for validating program execution. The method involves identifying a program from a second computer system, obtaining, by a first computer system, a first copy of a page for a file of the program from a second computer system to create a first obtained page, calculating a hash value for the first obtained page, storing the first obtained page in a local memory of the first computer system, storing the hash value for the first obtained page, and executing the program on the first computer system, wherein the first obtained page is removed from the local memory during execution of the program. Executing the program involves obtaining a second copy of the page from the second computer system to create a second obtained page, calculating a hash for the second obtained page, determining whether the hash value for the first obtained page is equal to the hash value for the second obtained page, and performing an appropriate action in response to determining whether the hash value for the first obtained page is equal to the hash value for the second obtained page.

In general, in one aspect, the invention relates to a first computer system for validating program execution that includes a processor, a local memory, and software instructions. The software instructions are stored in memory. The software instructions cause the first computer system to identify a program from a second computer system, obtain a first copy of a page for a file of the program from the second computer system to create a first obtained page, calculate a hash value for the first obtained page, store the first obtained page in the local memory of the first computer system, store the hash value for the first obtained page, and execute the program on the first computer system, wherein the first obtained page is removed from the local memory during execution of the program. Executing the program involves obtaining a second copy of the page from the second computer system to create a second obtained page, calculating a hash for the second obtained page, determining whether the hash value for the first obtained page is equal to the hash value for the second obtained page, and performing an appropriate action in response to determining whether the hash value for the first obtained page is equal to the hash value for the second obtained page.

In general, in one aspect, the invention relates to a computer readable medium that includes computer readable program code embodied therein. The computer readable program code causes a computer system to identify a program from a second computer system, obtain, by a first computer system, a first copy of a page for a file of the program from a second computer system to create a first obtained page, calculate a hash value for the first obtained page, store the first obtained page in a local memory of the first computer system, store the hash value for the first obtained page, and execute the program on the first computer system, wherein the first obtained page is removed from the local memory during execution of the program. Executing the program involves obtaining a second copy of the page from the second computer system to create a second obtained page, calculating a hash for the second obtained page, determining whether the hash value for the first obtained page is equal to the hash value for the second obtained page, and performing an appropriate action in response to determining whether the hash value for the first obtained page is equal to the hash value for the second obtained page.

Other aspects of the invention will be apparent from the following description and the appended claims.

DETAILED DESCRIPTION

Figure 1:
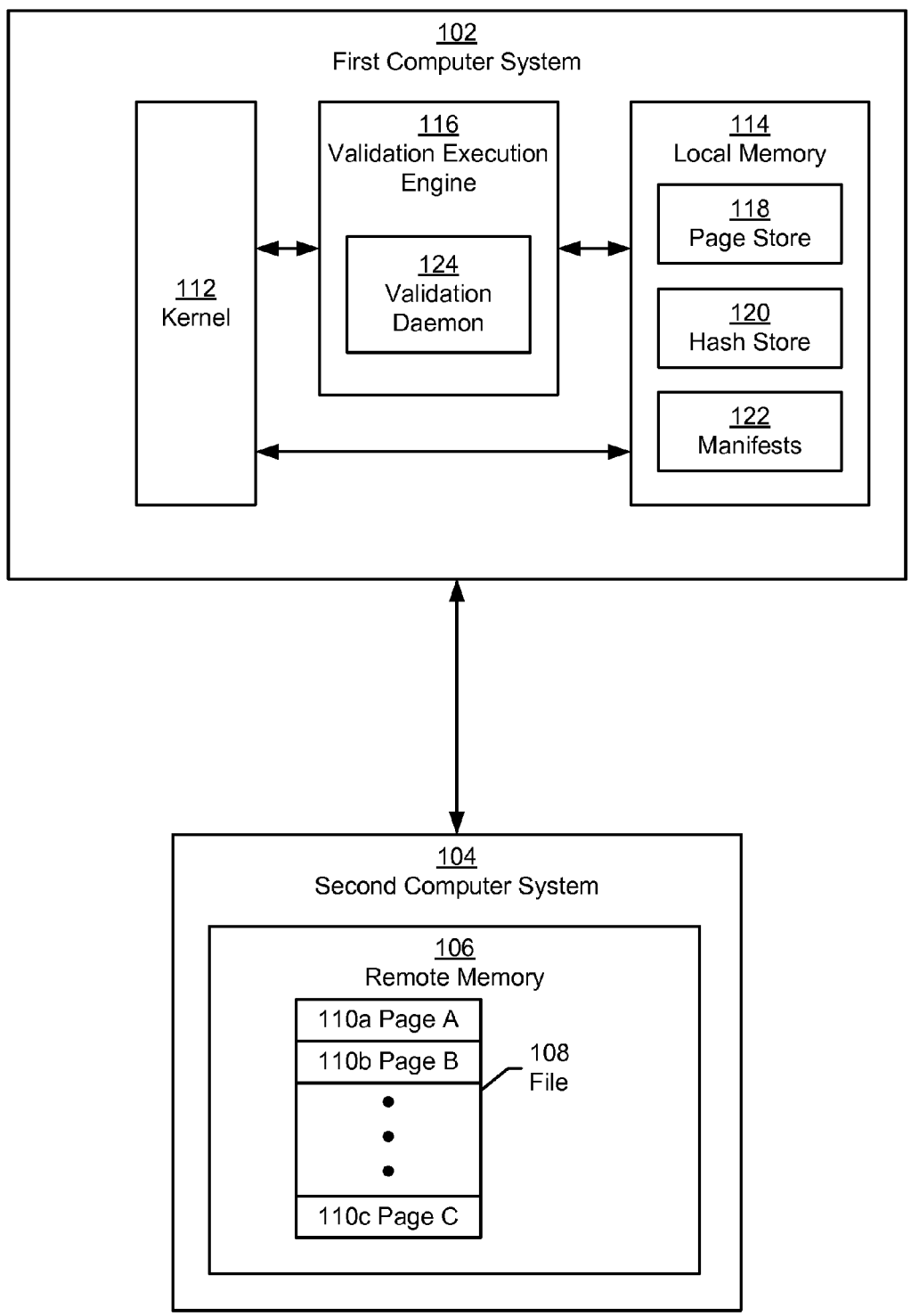
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for validating individual pages during execution of the program. Embodiments of the invention allow for the first computer system to obtain data from a second computer system on a per page basis by being able to detect changes in a page of a file that is validated. Specifically, a first computer obtains one or more files for executing a program from remote memory on a second computer. Each file is stored as one or more pages on the first computer system and the second computer system. After obtaining each page, the hash value of each page is calculated and stored. As the first computer is executing the program, the first computer may require the removal of one page from memory in order to load another page. If the first computer requires the removed page again, then the first computer may obtain the removed page from the remote memory on the second computer system. After obtaining the page, the first computer calculates the hash value for the page. Next, the stored hash value is compared with the newly calculated hash value to determine whether the page changed from the last time the page was obtained from the remote memory. If the page has changed, then the execution of the program is stopped. If the page did not change, then the page is considered valid and the execution of the program continues.

FIG. 1 shows a schematic diagram of a system in accordance with one or more embodiments of the invention. As shown in FIG. 1, the system includes a first computer system (102) and a second computer system (104). A computer system (e.g., first computer system (102), second computer system (104)) is any type of physical or virtual device that includes functionality to process instructions. For example, a computer system (e.g., first computer system (102), second computer system (104)) may be a physical computing device, such as one or more servers, a single computing device (e.g., a personal computer, a mobile device, a workstation computer), a node in a distributed computer system, or any other type of physical computing device. The first computer (102) may be connected to the second computer (104) via wired and/or wireless communication. For example, the first computer (102) may be connected to the second computer (104) via a network (e.g., a local area network (LAN), a wide area network (WAN) such as the Internet, or any other similar type of network) or via a direct connection.

Continuing with FIG. 1, the second computer system (104) includes remote memory (106) in accordance with one or more embodiments of the invention. The remote memory is any type of storage unit for storing data. For example, the remote memory (106) may include main memory, an auxiliary data store, such as disk or flash memory, or any other storage unit for data.

In one or more embodiments of the invention, the remote memory (106) is accessible by multiple computer systems (e.g., first computer system (102), second computer system (104)). For example, the remote memory (106) may be simultaneously accessible by the first computer system (102), the second computer system (104), as well as another computer system (not shown).

In one or more embodiments of the invention, the remote memory stores files for a program. In one or more embodiments of the invention, the files (108) include the instructions and data to execute the program. For example the files (108) may include executable files, data files, and library files. Program files are files that include instructions that are executed to perform the functions of the program. Data files include data accessed by the program during the execution. For example, data files may include one or more data sets. Library files include instructions and data that are common to multiple programs. Specifically, library files are shared by multiple programs (not shown).

In one or more embodiments of the invention, each file (108) in the remote memory is logically divided into multiple pages (110). In one or more embodiments of the invention, a page corresponds to a fixed size of memory, that is contiguous when referenced using physical memory address and a virtual memory address. In one or more embodiments of the invention, the page is the smallest unit of data to be allocated by an operating system for a program. Data within a page is ordered according to the file while different pages associated with the file may be unordered.

In addition to the remote memory (106), the second computer system (104) may include additional components not shown on FIG. 1. For example, the second computer system (104) may include processing resources, a manager for the remote memory (106), an authentication and authorization unit for controlling access to the remote memory (106), a display, an input and output device, and other such components.

The second computer system (104) is connected to the first computer system (102). The first computer system (102) includes functionality to obtain the file (108) as individual pages (110) from the second computer system (104). The first computer system may include, amongst other possible components, a kernel (112), a local memory (114), and a validation and execution engine (124). Each of these components is discussed below.

The kernel (112) includes functionality to provide the basic services for the first computer system (102). Specifically, a kernel is a component of the operating system of first computer system (102) that manages the resources available on the first computer system (102). For example, the kernel (112) may include a manager for managing processes, a scheduler for determining which process to execute, and other such components. In one or more embodiments of the invention, the kernel (112) includes functionality to ensure that program and each page of each file is verified prior to execution of the program. Moreover, the kernel (112) includes functionality to schedule instructions in the pages for execution once the files are verified.

In one or more embodiments of the invention, the local memory (114) on the first computer system (102) is any type of memory unit controlled by the first computer system. For example, local memory (114) may include both main memory and secondary storage. The local memory (114) includes functionality to store pages (118), a hash store (120), and manifests (122).

The pages (118) include copies of pages obtained from remote memory (106). In one or more embodiments of the invention, the pages (118) are stored in main memory of the local memory (114).

A hash store (120) includes hash values for each page of the file (108). A hash value is a data value that is calculated from each of the obtained pages using a hash function. The hash function performs an operation on the bits in the page to calculate the hash value. For example, the hash function may be a Message-Digest algorithm (MD5) hash function, a Secure Hash Algorithm (SHA) hash function (e.g., SHA-1, SHA-224, SHA-256, SHA-384, SHA-512), or a RACE Integrity Primitives Evaluation Message Digest (RIPEMD) hash function. When the bits of the page changes, the hash value for the page also changes. Thus, the hash value provides a digital signature for the page. The hash value may require less storage capacity than the page. In one or more embodiments of the invention, hash values in the hash store (120) may include hash values for pages that are no longer in the local memory (114).

In one or more embodiments of the invention, the manifests (122) provide information about files and programs that are registered with the first computer system. A file or program is registered with the first computer system when information about the file is known (e.g., by an administrator managing the first computer system (102)), when the file or program was previously used by the first computer system (102), when the file or program was registered with a computer system trusted by the first computer system (102), etc. The manifests may include an identifier, metadata, and a hash value of the file.

The identifier is any type of unique identifier for the file. For example, the identifier may be an alphanumeric character string assigned to the file, a name and version of the program with a file name, the full pathname to the file, a hash value calculated from the file, etc. The metadata may include size of, access control lists for, owner of the program, a work group developing or owning the program, identifier of the individual or computer used to last modified the program, and other such information.

Similar to the hash value for a page, the hash value of the file provides a unique summary of the file contents. Specifically, the hash value may be used to detect when the contents of the file change, such as from when the file is registered with the first computer system.

The manifests (122) may be stored in different directories in the local memory (114). For example, a revocation directory may include manifests (122) that identify the programs that cannot be validated because of security vulnerabilities while another directory includes manifests for known programs that can be validated.

Continuing with FIG. 1, the validation execution engine (124) includes functionality to validate programs, and files. In one or more embodiments of the invention, the validation execution engine (124) includes a validation daemon (124). The validation daemon (124) is a background process that includes functionality to receive a call from the kernel to validate the file, and to subsequently validate the file. Specifically, the validation daemon may start execution when the first computer system is powered up and execute without user intervention.

Figure 2:
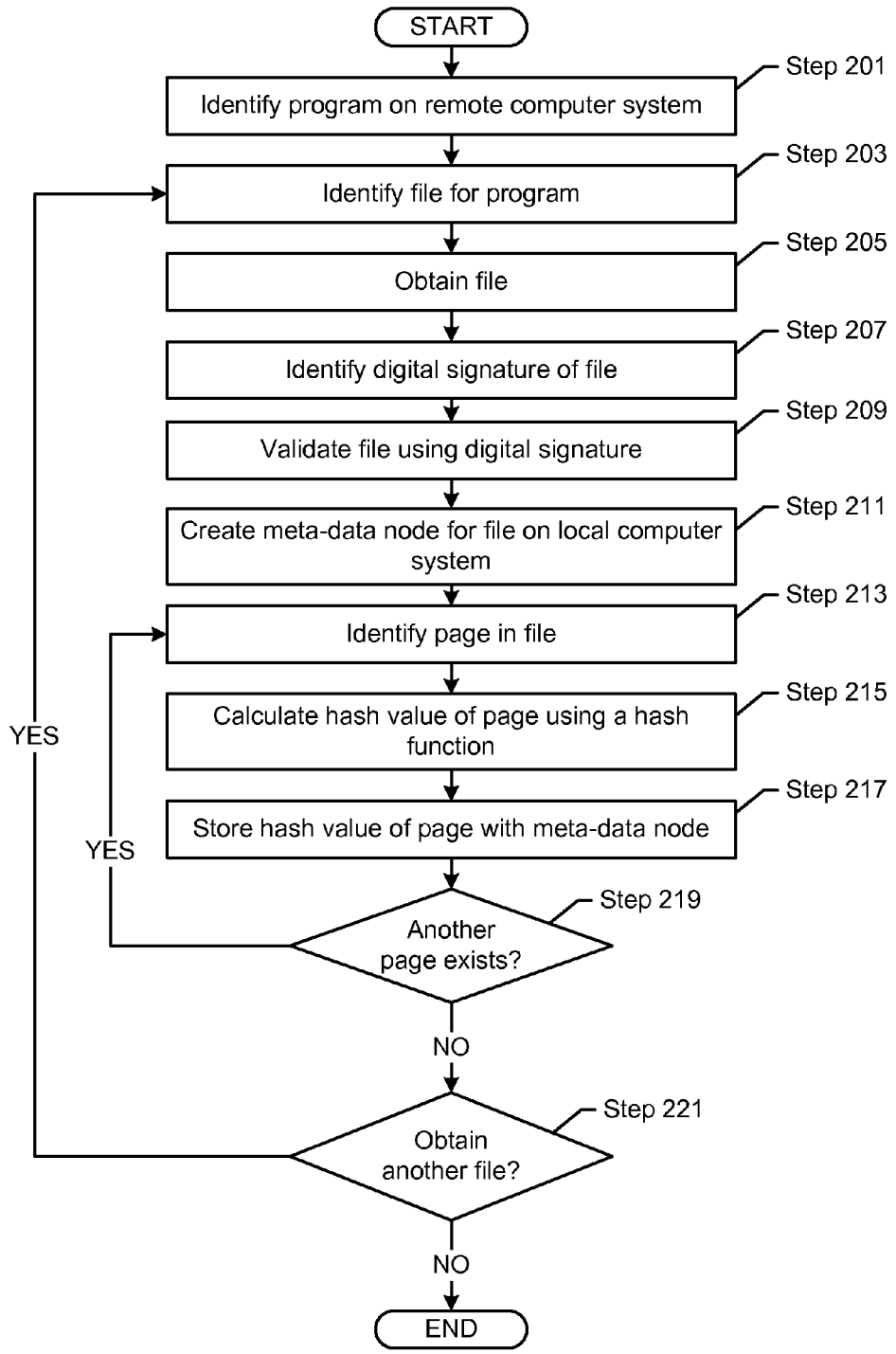
FIGS. 2-3 show flowcharts of a method in accordance with one or more embodiments of the invention.
Figure 3:
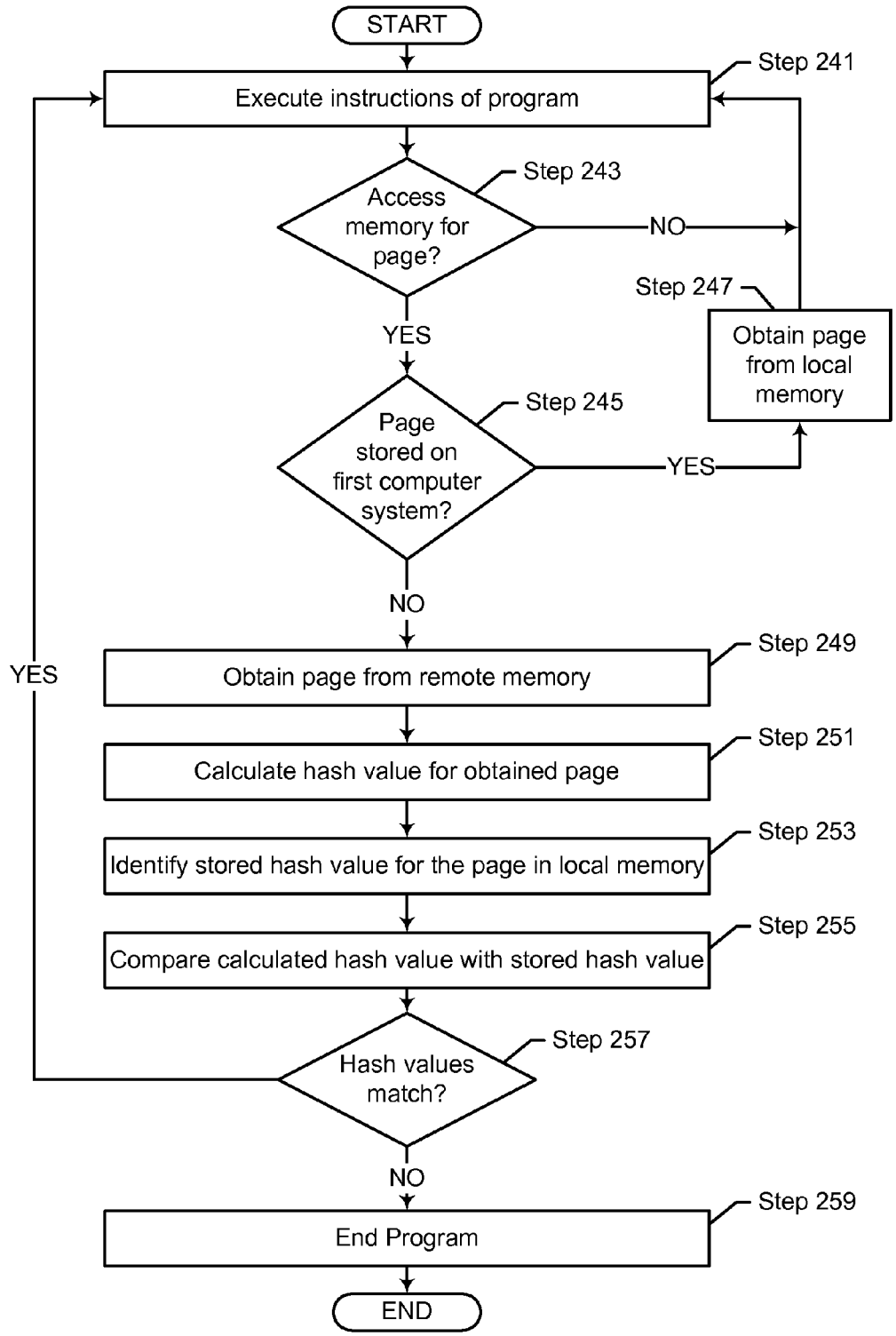

FIGS. 2-3 show flowcharts of a method in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 2 shows a flowchart for loading a program for execution on the first computer system in accordance with one or more embodiments of the invention. In Step 201, a program on a remote computer system is identified. Specifically, the program that is to be executed on the first computer is identified. In Step 203, a file for the program is identified. Different techniques may be used to identify a file. For example, the files of the program may be in a directory for the program on the remote memory. The files of the program may all be in the same directory or may be in different directories.

In Step 205, the file is obtained. Specifically, the data for the file is transferred from the second computer system to the first computer system. The kernel may request the validation daemon to validate the file. In order to validate the files, the digital signature for the file is obtained (Step 207). For example, the digital signature may be stored with the file and/or stored in a manifest corresponding to/associated with the file. For example, the digital signature may be stored as metadata with the file. In such scenario, the digital signature may be encrypted using a private key. In another example, the digital signature may be a simple hash value stored in a secure location in the manifests. Alternatively, the maniest may be accessed to determine whether the file is registered with the first computer system. Specifically, the identifier of the file may be used to access the maniests. If a manifest has a matching identifier, then a determination is made whether the digital signature for the file is in the manifest.

After accessing the digital signature, the file is validated using the digital signature (Step 209). In one or more embodiments of the invention, the digital signature references a public key certificate for validating the file. Using a cryptographic hash function and the contents of the file, a hash value is created for the file.

The manifests are queried using the hash value for the file. Specifically, a determination is made whether any of the manifests are associated with the hash value for the file. If the hash value is in a manifest located in the revocation directory, the validation of the file may full. Specifically, because the revocation directory includes manifest entries for files that have security vulnerabilities, when a hash value for the file matches the manifest entry, the file may be deemed to have security vulnerabilities. Thus, for the protection of the first computer system, the file may be deemed unsafe to use in execution of the program. Thus, the file may be considered invalid.

Conversely, the hash value of the file may be compared with manifest entries for files that are considered safe to execute. In such a scenario, if the hash value for the file matches the hash values in the manifests for files that are considered safe to execute, then the file may be deemed safe to use in execution. Thus, the file is considered valid.

Further, the hash value may be compared with the digital signature. Specifically, in cases in which a hash value is encrypted with a private key (e.g., a digital signature) is embedded in the file itself, the hash value is compared with the digital signature in the file. If the digital signature matches the hash value, then the file may be deemed safe to execute. In such a scenario, the file may be deemed valid.

In one or more embodiments of the invention, the result of the validation may be that the file is valid, the file is invalid, or that the file is not validated. If the file is valid, then the loading and execution of the file may proceed. If the file is invalid, the execution of the program may be prevented by the kernel on the first computer system. Specifically, the kernel may create an error message indicating that the file cannot be used in the execution of the program. If the file is not validated, then insufficient information for the validation to succeed exists. In such a scenario, the execution of the program may proceed with limited access to resources on the first computer system. For example, the program may be provided with limited privileges to access data, any networks, etc.

In Step 211, when the file is validated, a meta-data node for the file is created on the first computer system. The meta-data node temporarily stores validation information about the file on the first computer system. The meta-data node allows for subsequent uses of the file to not incur the cost of the validation while the file is stored on the first computer system. In one or more embodiments of the invention, the meta-data node is stored in a locked portion of main memory on the first computer system.

In Step 213, a page in the file is identified. As discussed above, the file is composed of multiple pages. The validation of the file ensures that each page of the file is valid. In Step 215, a hash value of the page is calculated using a hash function. The calculation of the hash value provides a unique summary of the contents of the page that may be used to validate a subsequently obtained copy of the page.

In Step 217, the hash value of the page is stored with the meta-data node. The hash value may be stored in the meta-data node or referenced by the meta-data node. In one or more embodiments of the invention, the hash value is in the locked section of main memory.

A determination is made whether another page exists (Step 219). If another page exists, then the method may repeat with Step 213. The obtaining and calculating the hash values of multiple different pages may be performed in parallel in accordance with one or more embodiments of the invention. In Step 221, a determination is made whether another file exists. Specifically, if another file exists, then the method may repeat for the next file with Step 203.

In one or more embodiments of the invention, steps 213-215 may be performed at virtually any time while the originally obtained copy of the page is in local memory. For example, steps 213-217 may be performed when the file is first obtained from the second computer system. Alternatively, Steps 213-215 may be performed directly before removing the page from memory. For example, limited memory capacity may require the removal of the page in order to make room for another page. In such a scenario, if a hash value for the page is not yet calculated, then the hash value for the page is calculated and stored. Thus, when the copy of the page is obtained from remote memory, the newly obtained copy page may be validated with the hash value calculated for the originally obtained copy of the page.

FIG. 3 shows a flowchart for executing a program in accordance with one or more embodiments of the invention. Specifically, FIG. 3 shows a flowchart for executing the program. In Step 241, instructions of the program are executed. During execution, pages of the file of the program may be accessed from local memory. As the program is executing the instructions, one or more page faults may occur. A page fault occurs when a page required for execution of the program is not in main memory. When a page fault occurs, a page in main memory may be replaced by a page from secondary storage, such as on the remote computer system or on the local computer system. In Step 243, a determination is made whether memory is accessed for a page. Specifically, a determination is made whether a page fault occurred.

If memory is not accessed, then the execution of instructions continue. If memory is accessed, then a determination is made whether the page is stored on the first computer system (Step 245). Specifically, a determination is made whether the memory required is locally stored, such as in secondary storage controlled by the first computer system. If the page is on the first computer system, then the page is obtained from local memory (Step 247). The instructions may continue executing in accordance with one or more embodiments of the invention.

If the page is not on the local computer system, then the page is obtained from remote memory (Step 249). Specifically, the page is requested from the second computer system. The process of requesting the page may include performing any authentication required to maintain security. For example, the first computer system may be required to present authentication credentials to the second computer system. The second computer system may use the authentication credentials to ensure that the second computer is in communication with the first computer. Namely, that the computer requesting the page is the first computer. In response to the request, a copy of the page is sent from the second computer system to the first computer system.

The hash value for the obtained copy of the page is calculated using the same hash function discussed above for the originally obtained copy of the page (Step 251). The hash value stored for the originally obtained copy of the page in local memory is obtained (Step 253). Specifically, the metadata node is accessed to obtain the hash value for the originally obtained copy of the page. The calculated hash value is compared with the stored hash value (Step 255).

In Step 257, a determination is made whether the hash values match. The hash values match when the page first obtained when the file was obtained is the same as the page that is obtained in Step 249.

If the hash values match, then the copy of the page obtained in Step 249 is used to continue execution of the program. Thus, the execution of the program may continue with Step 241. The result of executing the program may be displayed or stored in memory.

If the hash values do not match, then in one or more embodiments of the invention, the program ends (Step 259). Specifically, the page may be deemed as compromised. Because the original copy of the page is unavailable, processes that use the page may be halted. As a result, the program may shut down. Alternatively, other appropriate actions may be performed. For example, the program may continue to execute but any further processing attempting to access the page may result in performing the method shown in FIG. 2 to obtain the page. Other appropriate actions may also be performed.

Embodiments of the invention allow for first computer system to execute a program stored on the second computer system. Specifically, embodiments of the invention allow for the first computer system to obtain pages from the second computer system. The first computer system does not need to lock the pages in local memory. Thus, the local memory of the first computer system need not be consumed to hold the entire program at once. Similarly, the second computer system does not need to prevent the page from being modified while the page is in use by the first computer system. If the page is modified, then the fact of the modification is detected by the first computer system.

In one or more embodiments of the invention, multiple computer systems may simultaneously access the same page in memory. If the page is modified by one of the multiple computer systems, then the other computer systems can detect the modification through the use of the hash values. Furthermore, embodiments of the invention provide a mechanism for security. Specifically, in the initial validation, the first computer system ensures that the program from the second computer system is valid. In subsequent accesses to pages on the second computer system, the first computer system can detect when malicious code is added to a page while the program is executing. Thus, security is maintained throughout the execution with minimum overhead.

Figure 4:
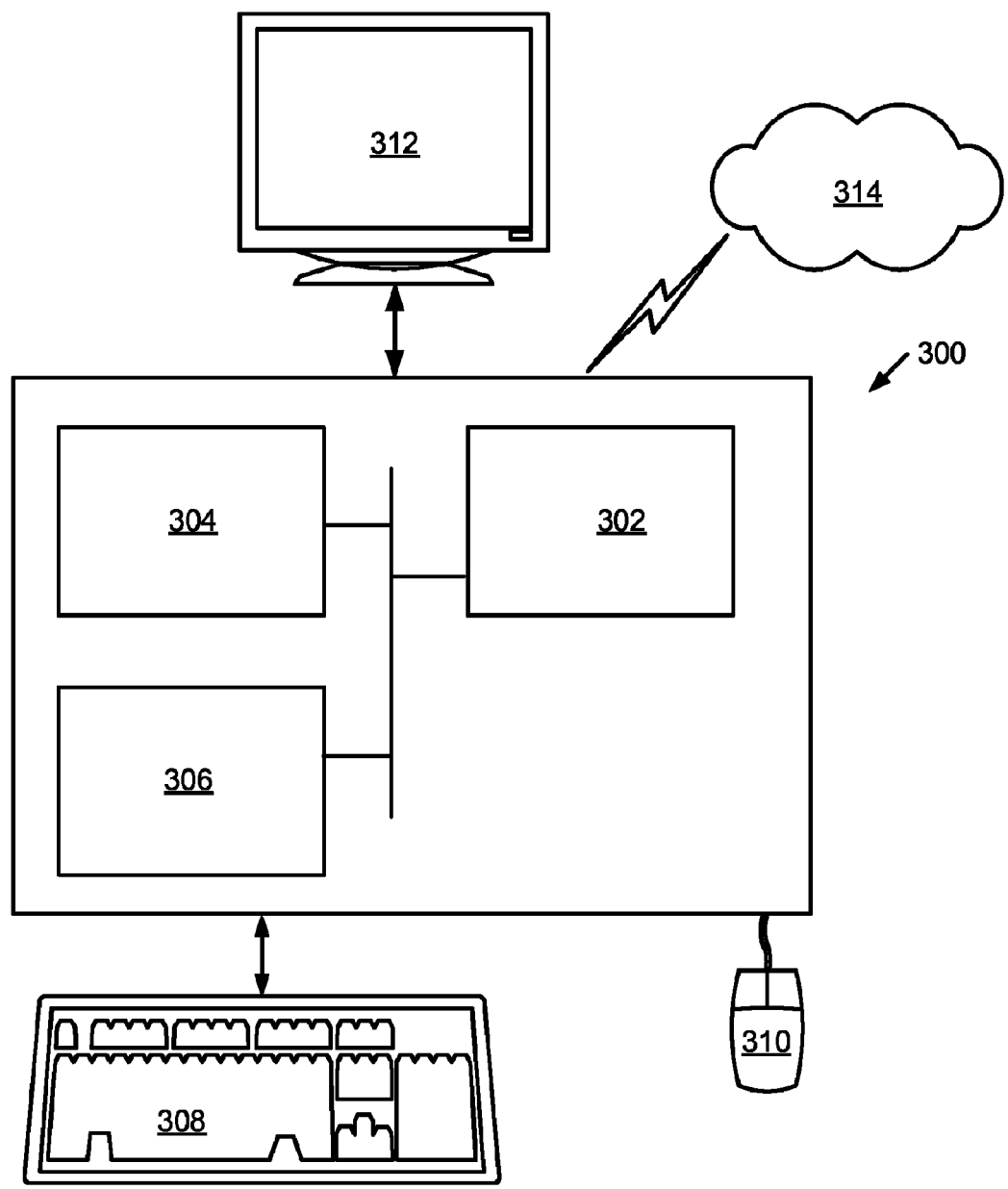
FIG. 4 shows a computer system in accordance with one or more embodiments of the invention.

Embodiments of the invention may be implemented on virtually any type of computer regardless of the platform being used. For example, as shown in FIG. 4, a computer system (300) includes one or more processor(s) (302), associated memory (304) (e.g., random access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor). The computer system (300) may be connected to a network (314) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., first computer system, second computer system, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Alternatively, each computer system (e.g., first computer system, second computer system) may be a collection of computing resources. For example, each computer system may be zone in a zone environment. The zone environment in accordance with one or more embodiments of the invention is discussed in detail in commonly owned U.S. application Ser. No. 11/953,839, entitled "Method and System for Enforcing Resource Constraints for Virtual Machines across Migration," in the names of Sunay Tripathy, the contents of which is hereby incorporated by reference in their entirety. In the zone environment, the first computer system may be implemented as a non-global zone while the second computer system is implemented as a global zone or a non-global zone. Each domain in the hypervisor environment is allocated separate memory. Specifically, an application domain cannot access the memory of another application domain.

As another example, the first computer system and the second computer system may execute in a hypervisor environment. The hypervisor environment in accordance with one or more embodiments of the invention is discussed in detail in commonly owned U.S. patent application Ser. No. 11/864,851, entitled "Apparatus and Method for Memory Address Translation Across Multiple Nodes," in the names of Christopher A. Vick, Anders Landin, Olaf Manczak, Michael H. Paleczny, and Gregory M. Wright, the contents of which is hereby incorporated by reference in their entirety. In the hypervisor environment, the first computer system may be implemented as the application domain or the privileged domain. Similarly, the second computer system may be implemented as another application domain or a privileged domain. The computer systems may communicate via the hypervisor. Each domain in the hypervisor environment is allocated separate memory. Specifically, an application domain cannot access the memory of another application domain.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for validating program execution, comprising:
   identifying a program from a second computer system;
   obtaining, by a first computer system, a first copy of a page for a file of the program from a second computer system to create a first obtained page;
   calculating a hash value for the first obtained page;
   storing the first obtained page in a local memory of the first computer system;
   storing the hash value for the first obtained page; and
   executing the program on the first computer system, wherein the first obtained page is removed from the local memory during execution of the program, and wherein executing the program comprises:
      obtaining a second copy of the page from the second computer system to create a second obtained page;
      calculating a hash for the second obtained page;
      determining whether the hash value for the first obtained page is equal to the hash value for the second obtained page; and
      performing an appropriate action in response to determining whether the hash value for the first obtained page is equal to the hash value for the second obtained page.

2. The method of claim 1, further comprising:
   validating the file prior to executing the program.

3. The method of claim 2, wherein validating the file comprises:
   performing a cryptographic hash of the file using a public key certificate to obtain a hash value for the file; and
   comparing the hash value for the file with a plurality of manifest entries in a revocation directory to determine whether a match is found,
   wherein the file is valid when a match is not found.

4. The method of claim 1, wherein the file is one selected from a group consisting of an executable file, a data file, and a library file.

5. The method of claim 1, wherein the first computer system is implemented in a first zone and wherein the second computer system is implemented in a second zone executing on the same physical computing device.

6. The method of claim 1, wherein performing the appropriate action comprises:
   stopping execution of the program when the hash value for the first obtained page is not equal to the hash value for the second obtained page; and
   continuing execution of the program when the hash value for the first obtained page is equal to the hash value for the second obtained page.

7. The method of claim 1, wherein the first computer system is implemented as a first guest domain and wherein the second computer system is implemented as a second guest domain executing in a hypervisor environment on the same physical computing device.

8. A first computer system for validating program execution comprising:
   a processor;
   a local memory; and
   software instructions stored in memory for causing the first computer system to:
      identify a program from a second computer system;
      obtain a first copy of a page for a file of the program from the second computer system to create a first obtained page;
      calculate a hash value for the first obtained page;
      store the first obtained page in the local memory of the first computer system;
      store the hash value for the first obtained page; and
      execute the program on the first computer system, wherein the first obtained page is removed from the local memory during execution of the program, and wherein executing the program comprises:
         obtaining a second copy of the page from the second computer system to create a second obtained page;
         calculating a hash for the second obtained page;
         determining whether the hash value for the first obtained page is equal to the hash value for the second obtained page; and
         performing an appropriate action in response to determining whether the hash value for the first obtained page is equal to the hash value for the second obtained page.

9. The first computer system of claim 8, wherein the software instructions further cause the first computer system to:
validate the file prior to executing the program.

10. The first computer system of claim 9, wherein validating the file comprises:
performing a cryptographic hash of the file using a public key certificate to obtain a hash value for the file; and
comparing the hash value for the file with a plurality of manifest entries in a revocation directory to determine whether a match is found,
wherein the file is valid when a match is not found.

11. The first computer system of claim 8, wherein the file is one selected from a group consisting of an executable file, a data file, and a library file.

12. The first computer system of claim 8, wherein the first computer system is implemented in a first zone and wherein the second computer system is implemented in a second zone executing on the same physical computing device.

13. The first computer system of claim 8, performing the appropriate action comprises:
stopping execution of the program when the hash value for the first obtained page is not equal to the hash value for the second obtained page; and
continuing execution of the program when the hash value for the first obtained page is equal to the hash value for the second obtained page.

14. The first computer system of claim 8, wherein the first computer system is implemented as a first guest domain and wherein the second computer system is implemented as a second guest domain executing in a hypervisor environment on the same physical computing device.

15. A non-transitory computer readable medium comprising computer readable program code embodied therein for causing a computer system to:
identify a program from a second computer system;
obtain, by a first computer system, a first copy of a page for a file of the program from a second computer system to create a first obtained page;
calculate a hash value for the first obtained page;
store the first obtained page in a local memory of the first computer system;
store the hash value for the first obtained page; and
execute the program on the first computer system, wherein the first obtained page is removed from the local memory during execution of the program, and wherein executing the program comprises:
obtaining a second copy of the page from the second computer system to create a second obtained page;
calculating a hash for the second obtained page;
determining whether the hash value for the first obtained page is equal to the hash value for the second obtained page; and
performing an appropriate action in response to determining whether the hash value for the first obtained page is equal to the hash value for the second obtained page.

16. The non-transitory computer readable medium of claim 15, wherein the computer readable program code further cause the computer system to:
validate the file prior to executing the program.

17. The non-transitory computer readable medium of claim 16, wherein validating the file comprises:
performing a cryptographic hash of the file using a public key certificate to obtain a hash value for the file; and
comparing the hash value for the file with a plurality of manifest entries in a revocation directory to determine whether a match is found,
wherein the file is valid when a match is not found.

18. The non-transitory computer readable medium of claim 15, wherein the file is one selected from a group consisting of an executable file, a data file, and a library file.

19. The non-transitory computer readable medium of claim 15, wherein the first computer system is implemented in a first zone and wherein the second computer system is implemented in a second zone executing on the same physical computing device.

20. The non-transitory computer readable medium of claim 15, wherein the first computer system is implemented as a first guest domain and wherein the second computer system is implemented as a second guest domain executing in a hypervisor environment on the same physical computing device.

* * * * *